United States Patent [19]

Kurokawa et al.

[11] Patent Number: 5,535,433
[45] Date of Patent: Jul. 9, 1996

[54] HANDS-FREE CIRCUITRY PROVIDING AUDIO SIGNAL ADJUSTMENT BASED ON SPEAKER VOLUME VALUE

[75] Inventors: Osamu Kurokawa, Hino; Buntaro Sawa, Sagamihara, both of Japan

[73] Assignee: Kabushiki Kaisha Toshiba, Kawasaki, Japan

[21] Appl. No.: 390,380

[22] Filed: Feb. 17, 1995

Related U.S. Application Data

[63] Continuation of Ser. No. 896,616, Jun. 10, 1992, abandoned.

[30] Foreign Application Priority Data

Jun. 11, 1991 [JP] Japan .................................. 3-139226

[51] Int. Cl.⁶ .............................. H04B 1/38; H04M 9/08
[52] U.S. Cl. .............................. 455/79; 455/89; 379/388; 379/390
[58] Field of Search ................................ 455/79, 89, 116, 455/234, 151, 355; 379/388, 389, 390

[56] References Cited

U.S. PATENT DOCUMENTS

| | | |
|---|---|---|
| 4,378,603 | 3/1983 | Eastmond .................................. 455/79 |
| 4,400,584 | 8/1983 | Vilmur ...................................... 455/79 |
| 4,629,829 | 12/1984 | Puhl et al. ................................ 379/58 |
| 4,648,110 | 3/1987 | Elsasser ................................... 379/388 |
| 4,715,063 | 12/1987 | Haddad et al. .......................... 379/388 |
| 4,982,425 | 1/1991 | Yoshida ................................... 379/388 |
| 5,201,068 | 4/1993 | Kawashima ............................. 455/89 |

Primary Examiner—Edward F. Urban
Attorney, Agent, or Firm—Finnegan, Henderson, Farabow, Garrett & Dunner

[57] ABSTRACT

A hands-free circuitry in which, in order to prevent howling caused by acoustic coupling between a speaker and a microphone, a loss is inserted in a transmit audio path in a receive mode while a loss is inserted in a receive voice path in a transmit mode and values of the losses are controlled according to the volume set value of the speaker. Since the quantities of the losses are minimized when a howling margin is sufficient, simplex communication can be prevented that a user cannot listen to party's receive voice signal due to excessive attenuation.

12 Claims, 10 Drawing Sheets

5,535,433

HANDS-FREE CIRCUITRY PROVIDING AUDIO SIGNAL ADJUSTMENT BASED ON SPEAKER VOLUME VALUE

This application is a continuation, of application Ser. No. 07/896,616 filed Jun. 10, 1992, now abandoned.

BACKGROUND OF THE INVENTION

1. Field of the Invention

The present invention relates to a hands-free circuitry for use in a mobile telephone system, etc. which prevents howling caused by acoustic coupling between a speaker and a microphone of a telephone set.

2. Description of the Related Art

In a mobile telephone system, etc. in which two parties talk with each other on a duplex communication basis with use of a speaker and a microphone, a so-called hands-free control circuit is used for the purpose of preventing howling caused by acoustic coupling between the speaker and microphone.

For a hands-free control circuit, a voice switch type circuit is typically used in which the level of a signal outputted from a microphone (hereinafter refer to as transmit audio signal) is compared with that of a signal to be inputted to a speaker (hereinafter refer to as receive audio signal), and when the level of the transmit audio signal is higher, the level of the receive audio signal is lowered so that the circuit is in the "transmit mode" and when the level of the receive audio signal is higher, the level of the transmit audio signal is lowered so that the circuit is in the "receive mode".

FIG. 10 shows an example of a hands-free control circuit of the voice switch type which is used in a mobile telephone system.

In FIG. 10, a transmit audio signal outputted from a microphone 5 is transmitted to a transceiver (transmitter) (not shown) through an attenuating circuit 71 and an interface circuit 8 and then transmitted to a telephone network. The attenuating circuit 71, which comprises a resistor and a switch SW connected in parallel to the resistor, performs its attenuating function by turning on and off the switch SW.

On the other hand, a receive audio signal, which is transmitted from the other party and received at the transceiver (receiver) (not shown), is inputted into a speaker 4 through an interface circuit 1, an attenuating circuit 2 and an amplifier 3. The attenuating circuit 2 functions to adjust the sound volume of the speaker 4.

A comparing circuit 12 compares the level of the transmit audio signal transmitted from the microphone 5 via the amplifier 6 and detected at a transmit audio rectifier 11 with the level of the receive audio signal transmitted from the other party and detected at a receive audio rectifier 10, and outputs a logic signal corresponding to its comparison result.

A logic control circuit 13 judges, on the basis of an output of the comparing circuit 12, whether or not the hands-free control circuit is in the transmit mode or in the receive mode, and controls the attenuating circuit 7 or 2 according to its judgement result under the control of a command received from a CPU (not shown).

When the logic control circuit 13 judges that the hands-free control circuit is in the transmit mode, the receive audio signal is attenuated; while, when the logic control circuit 13 judges that the circuit in the receive mode, the transmit audio signal is attenuated, as described above.

FIG. 11 shows attenuation characteristics of transmit and receive levels in the transmit and receive modes when the above control is carried out.

As shown in FIG. 11, in the prior art hands-free control circuit, the receive audio signal and the transmit audio signal are selectively attenuated depending on the transmit or receive mode with a constant attenuation factor.

Because the attenuation factor is constant, when the mode is changed from the receive mode to the transmit mode under such a condition that the receive audio volume is lowered by user's manual operation to a speaker volume, the receive audio volume will be further attenuated according to the constant attenuation factor.

When the receive audio volume is low, a howling margin is sufficiently high with a small howling possibility. However, further attenuating the receive audio volume based on the constant attenuation factor is undesirable because the receive audio volume is attenuated down to an unnecessary low level.

As a result, the other party's voice becomes hardly audible especially when the receive audio volume level is low, and therefore a so-called simplex communication is likely to be incurred.

As described above, in the conventional hands-free control circuit, the factor of attenuation when attenuating the receive audio signal or the transmit audio signal according to the transmit or receive mode is always constant. Thus, the conventional hands-free control circuit has a problem that, when switching is carried out from the receive mode to the transmit mode with the speaker volume set to a low level, the receive audio volume is attenuated too far. Therefore, the other party's voice becomes hardly audible, that is, the simplex communication is incurred.

SUMMARY OF THE INVENTION

It is therefore an object of the present invention to provide a hands-free circuitry for a telephone system, etc. which can attenuate a transmit audio signal or a receive audio signal with an attenuation factor being always optimum.

It is another object of the present invention to provide a hands-free circuitry which can suppress the excessive attenuation of the receive audio volume when switching is carried out from the receive mode to the transmit mode under the situation where the speaker volume is set to a low level, thereby preventing the simplex communication.

In order to attain the above objects, in accordance with the present invention, there is provided a hands-free circuitry for controlling the application of a receive audio signal from a communication path to a speaker and the application of a transmit audio signal from an audio signal source to the communication path, comprising first adjusting means for adjusting the transmit audio signal; second adjusting means for adjusting the receive audio signal; comparing means for comparing a level of the transmit audio signal with a level of the receive audio signal; input means for inputting a volume value for the speaker, the volume value being used for changing the level of the receive audio signal to be applied to the speaker; and control means for activating one of the first adjusting means and the second adjusting means in response to the comparing means, and for varying an adjusting factor of at least either one of the first adjusting means and the second adjusting means in response to the volume value of the speaker.

With this construction of the hands-free circuitry, the receive audio signal is attenuated by the receive audio attenuator in the transmit mode in which the level of the transmit audio signal is higher than that of the receive audio signal, the transmit audio signal is attenuated by the transmit audio attenuator in the receive mode in which the level of the receive audio signal is higher than that of the transmit audio signal, and the audio signal attenuation of the receive or transmit audio attenuator is controlled depending on a speaker volume control.

DESCRIPTION OF THE PREFERRED EMBODIMENTS

An embodiment of the present invention will be described with reference to the accompanying drawings.

Figure 1:
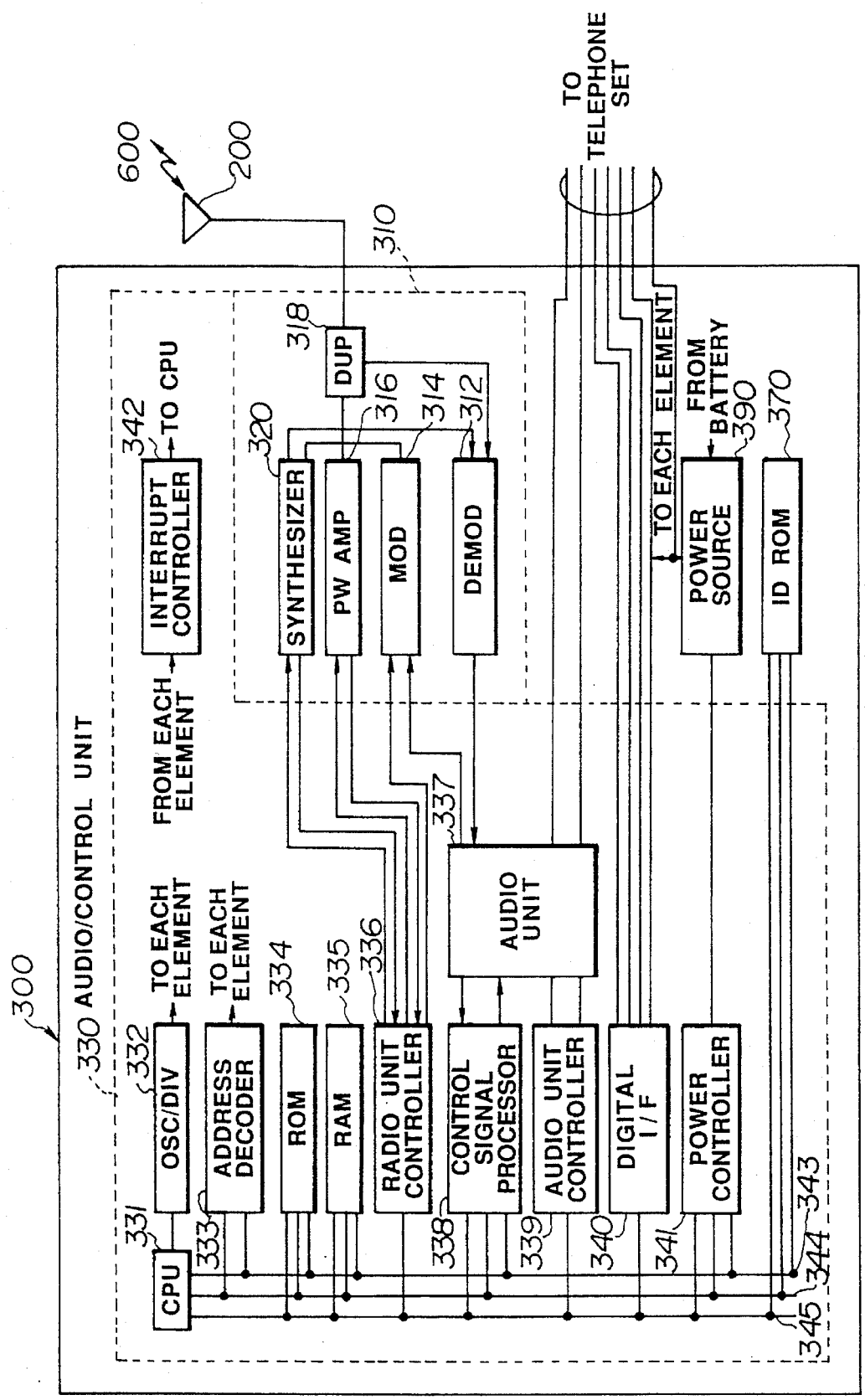
FIGS. 1 and 2 are a block diagram of a mobile telephone system in which a hands-free control circuit of the present invention is used.
Figure 2:
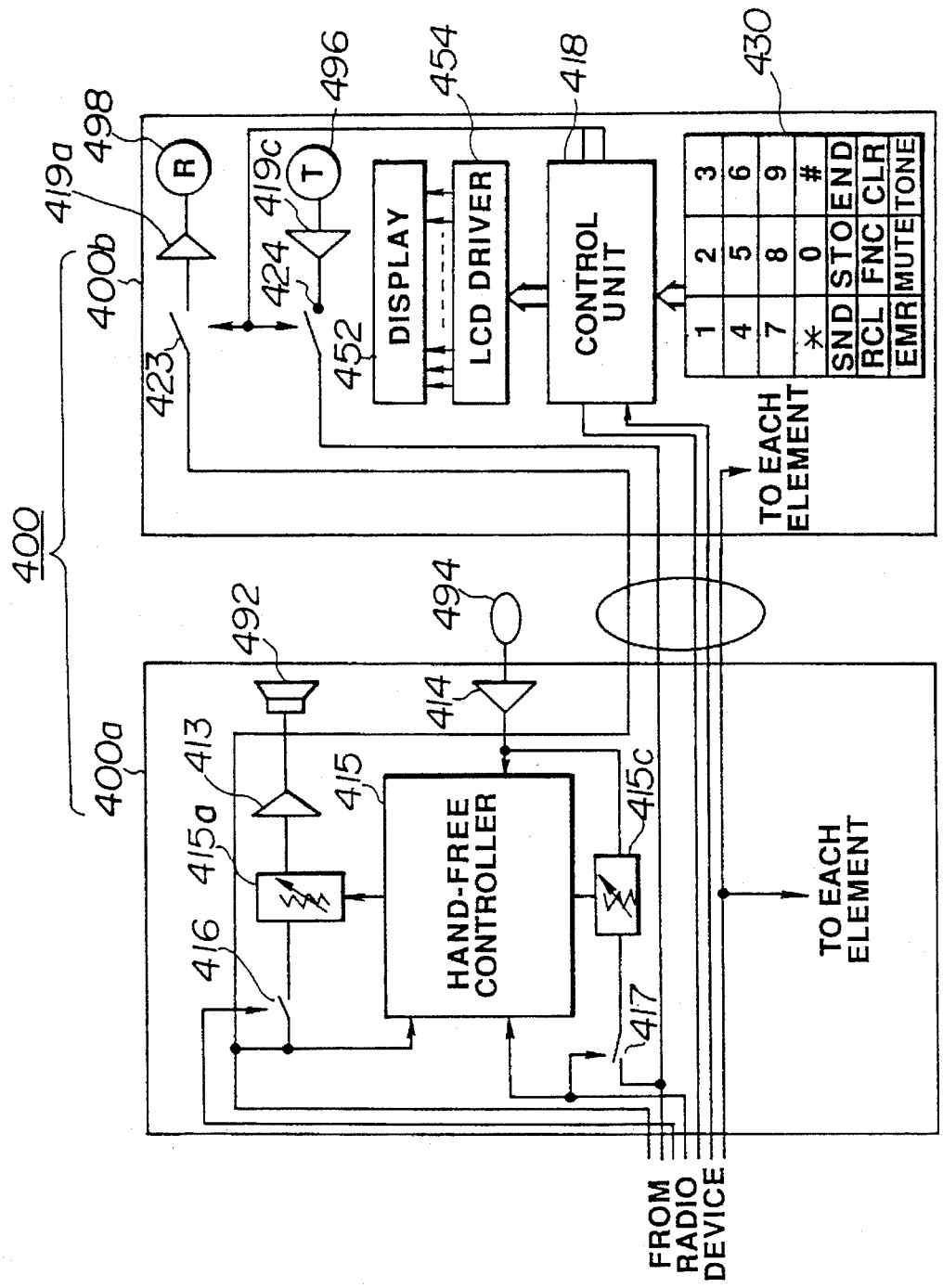

Referring to FIGS. 1 and 2, the car telephone device 100a–100n comprises an antenna 200, a radio device 300 and a telephone set 400.

Antenna 200 is provided outside of car 14 while radio device 300 is mounted within a trunk of car 14. Telephone set 400 includes a telephone body 400a and a handset 400b which are placed near the driver's seat in car 14.

As shown in FIG. 2, radio device 300 establishes a radio channel 600 with base station 13 (see FIG. 1) through antenna 200, and mainly includes a radio unit 310 which transmits/receives signals to/from the base station, audio/control unit 330 which provides general control over the entire device, IDROM 370 which stores ID numbers and telephone numbers registered in the central office, and power source 390 which receives electric power from a battery mounted on car 14 and feeds power to the respective elements concerned of the device 100. Radio unit 310 includes a demodulator 312, modulator 314, power amplifier 316, duplexer 318 and synthesizer 320.

Demodulator 312 demodulates a signal received from base station 13 through radio circuit 600, antenna 200 and duplexer 318. The received signal includes an audio signal, control signals (WBD to be described later in more detail), etc.

Modulator 314 modulates the carrier wave with an audio signal, control signals, etc., and outputs the modulated signal from audio/control unit 330.

Power amplifier 316 amplifies transmission/reception signals output from modulator 314. Duplexer 318 transmits a signal received through radio circuit 600 and antenna 200 to demodulator 312 and transmits to antenna 200 a signal received through modulator 314 and power amplifier 316.

Synthesizer 320 is a local oscillator for channel selection and designates a frequency to be demodulated by demodulator 312 and a frequency to be modulated by modulator 314.

Audio/control unit 330 includes a CPU 331, oscillator/frequency divider 332, address decoder 333, ROM 334, RAM 335, radio unit controller 336, audio unit 337, control signal processor 338, audio unit controller 339, digital interface 340, power source controller 341, and interrupt controller 342. Reference numeral 343 denotes, for example, a 8-bit data bus; 344, an address bus; and 345, a control bus.

CPU 331 provides general control over the entire audio/control unit 330.

Oscillator/frequency divider 332 feeds a clock signal to CPU 331 and timing signals obtained by dividing the clock signal to the respective elements concerned.

An address decoder 333 outputs predetermined signals to the respective elements concerned in accordance with instructions from CPU 331.

ROM 334 stores various programs required for the operation of CPU 331. RAM 335 stores various items of data involved in the processing by CPU 331.

Radio unit controller 336 controls radio unit 310 on the basis of instructions from CPU 331. For example, radio unit controller 336 designates a frequency which synthesizer 320 is to designate, an amplification factor with which power amplifier 316 amplifies a signal, and a modulation factor with which modulator 314 modulates a signal. Controller 336 also receives an asynchronous signal output from synthesizer 320 and a detection signal output from power amplifier 316 and delivers them to CPU 331 for prevention of a wrong operation of the device.

Audio unit 337 transmits control signals of the received signals demodulated by demodulator 312 to control signal processor 338 and telephone set 400. Audio unit 337 also transmits to modulator 314 control signals from control signal processor 338 and an audio signal from telephone set 400. Audio unit 337 has the functions of forming the waveform of a control signal sent to control signal processor 338 and filtering the control signal to be sent to modulator 314.

Control signal processor 338 performs a bit and frame synchronization on the control signal output from audio unit 337, extracts as a parallel signal control data from the base station contained in the control signal which is a serial signal and transmits to audio unit 337 the control data as the parallel signal to be sent to the base station 13 as a control signal which is a serial signal.

Audio unit controller 339 performs various control operations on audio unit 337. For example, audio unit controller 339 provides a switching and controlling operation for feeding a received signal from audio unit 337 to control signal processor 338 and telephone set 400, and a switching and controlling operation for feeding any one of signals output from control signal processor 338 or telephone set 400 to audio unit 337.

Digital interface 340 provides an interfacing operation between radio unit 300 and telephone set 400.

Power source controller 341 provides control over power source 390. For example, power source controller 341 sets to various predetermined voltages a voltage fed from the battery (not shown) to power source 390 and feeds them to the respective elements concerned.

Interrupt controller 342 receives interrupt instructions from the respective elements concerned and interrupts CPU 331.

Telephone body 400*a* of telephone set 400 shown in FIG. 2 mainly includes amplifiers 413, 414; a hands-free controller 415; attenuators 415*a*, 415*c*; switches 416, 417; a hands-free microphone 494; a speaker 492; a hook switch (not shown); and an on/off switch (not shown). Amplifier 413 amplifies an audio signal from audio unit 337 of radio device 300 and outputs the resulting signal through speaker 492.

Amplifier 414 amplifies an audio signal from hands-free microphone 494 and transmits it to audio unit 337.

Hands-free controller 415 controls the attenuation factor of attenuator 415*a* which attenuates an audio signal input to amplifier 413 and also the attenuation factor of attenuator 415*c* which attenuates an audio signal output from amplifier 414.

Switch 416 performs a switching operation for either outputting an audio signal from audio unit 337 through speaker 492 or not.

Switch 417 performs a switching operation for either sending an audio signal from hands-free microphone 494 to audio unit 337 or not. The switching operation of these switches 416, 417 is performed in accordance with a control signal from audio/control unit 330 of radio device 300.

The hook switch (not shown) detects the on or off state of handset 400*b*. This detected signal is sent to audio/control units 330 of radio device 300. The on/off switch (not shown) switches on/off the entire car telephone device 100. This switching signal is sent to power source 390 of radio device 300.

Handset 400*b* mainly includes a control unit 418, amplifiers 419*a*, 419*c*; switches 423, 424; liquid crystal display 452; LCD driver 454; a key unit 430 of key pads; handset microphone 496; and handset receiver 498.

Control unit 418 provides general control over the entire handset 400*b* on the basis of control signals from audio/control units 330 of radio device 300, and transmits control signals, etc., from key pad 430 to audio/control unit 330 of radio device 300.

Amplifier 419*a* amplifies an audio signal from audio unit 337 and outputs it through handset receiver 498.

Amplifier 419*c* amplifies an audio signal from handset microphone 496 and transmits it to audio unit 337.

Switch 423 performs a switching operation for either outputting an audio signal from audio unit 337 through handset receiver 498 or not.

Switch 424 performs a switching operation for either outputting an audio signal from handset microphone 496 to audio unit 337 or not. The switching operations of these switches 423, 424 are controlled by control unit 418.

Liquid crystal display 452 includes a numeral display of several figures and displays having various functions. LCD driver 454 drives liquid crystal display 452 under control of control unit 418 to thereby make predetermined display.

Key unit 430 includes key pads for numerical keys "0"–"9" and functional keys "*", "#", "SND", "STO", "END", "RCL", "FNC", "CLR", "EMR", "MUTE", "TONE". When any one of the key pads is depressed, this fact is recognized by control unit 418.

Figure 3:
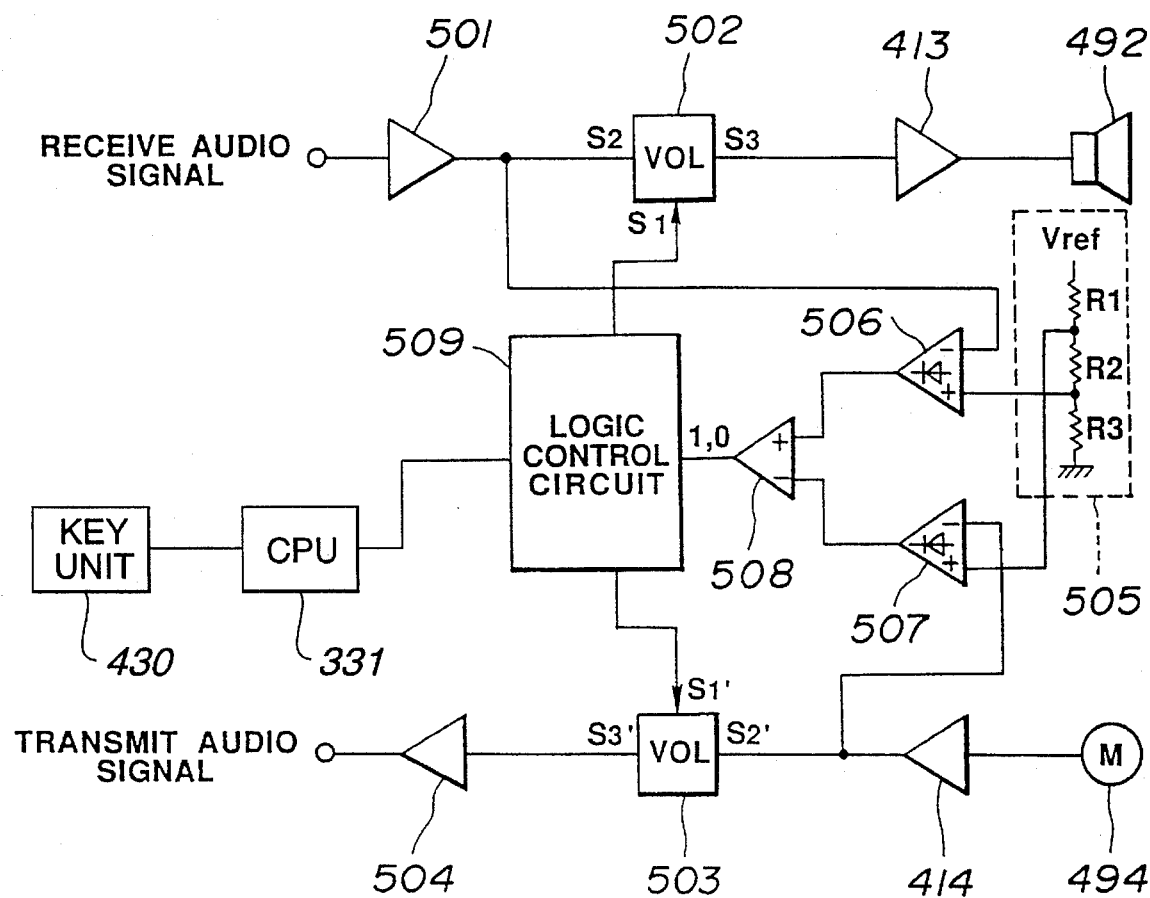
FIG. 3 is a block diagram of one embodiment of a hands-free control circuit according to the present invention.

Referring to FIG. 3, there is shown a block diagram of an arrangement of a hands-free control circuit applied to the car telephone device 100.

As illustrated, the hands-free control circuit comprises a receive interface 501, an electronic volume controller 502, an amplifier 413 for driving a speaker 492, a hands-free microphone 494, a microphone amplifier 414, an electronic volume controller 503, a transmit interface 504, an offset voltage circuit 505, a receive audio rectification circuit 506, a transmit rectification circuit 507, a comparing circuit 508 and a logic control circuit 509.

With this hands-free control circuit, a transmit audio signal issued from the microphone 494 is amplified at the microphone amplifier 414 and then branched to the electronic volume controller 503 and to the transmit rectification circuit 507.

The transmit audio signal sent to the electronic volume controller 503 is in turn sent to a transmitter (not shown) through the transmit interface 504 to be transmitted therefrom toward a line network.

A receive audio signal received from the other party through the line network and a receiver, on the other hand, is passed through the receive interface 1 and then branched into two paths, one to the electronic volume controller 502 and the other to the receive rectification circuit 506.

The receive audio signal branched to the electronic volume controller 502 is sent through the speaker driving amplifier 413 to the speaker 492.

Next, the receive and transmit rectification circuits 506 and 507 detect the receive and transmit audio signals respectively. The receive and transmit rectification circuits 506 and 507 receive, at their reference input sides, reference voltages supplied from the offset voltage circuit 505.

As will be seen from the drawing, the values of these reference voltages are set such that the reference voltage of the transmit rectification circuit 506 is higher than the reference voltage of the receive rectification circuit 507.

As a result, the comparing circuit 508 for comparing output levels of the rectification circuits 506 and 507 has an output of "0" when the level of the transmit audio signal is higher than the level of the receive audio signal and when the transmit and receive audio signal is not inputted into the rectification circuits 507 and 506. This state is called a transmit mode. The comparing circuit 508 has an output of "1" when the level of the receive audio signal is higher then the level of the transmit audio signal. This state is called a receive mode.

The logic control circuit 509 judges the transmit or receive mode on the basis of an output of the comparing circuit 508 and controls the electronic volume controllers 502 and 503 according to its judgement result to provide suitable attenuation factors to the receive and transmit audio signals.

For the control of the attenuation factors, in the hands-free control circuit of the present invention, the electronic volume controllers 502 and 503 are used as an example of the attenuating circuits.

The electronic volume controllers attenuate the receive and transmit audio signals according to chopper signals externally supplied. The factor of the attenuation to the receive and transmit audio signals may be determined according to the form of the chopper signals.

Figure 4:
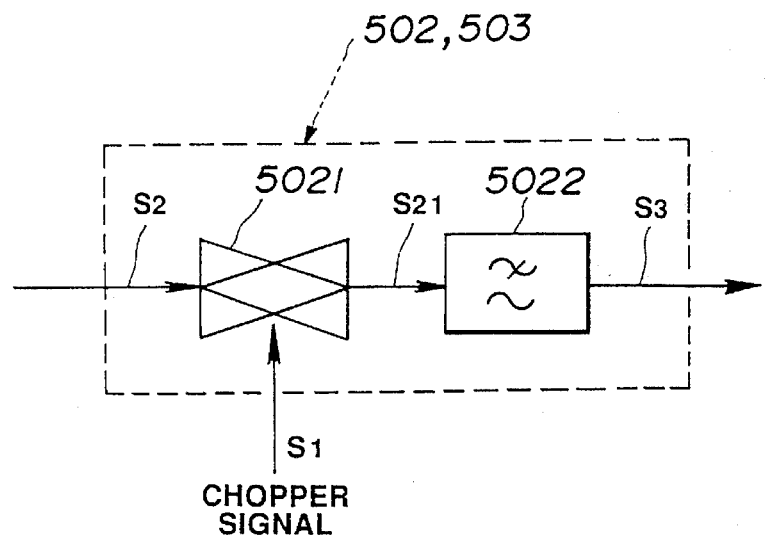
FIG. 4 is a block diagram of an electronic volume controller used in the hands-free circuit of FIG. 3.

FIG. 4 shows configuration of electronic volume controllers 502 and 503 used in the hands-free control circuit 415.

The electronic volume controller comprises a transmission gate 5021 and a lowpass filter 5022.

Figure 5:
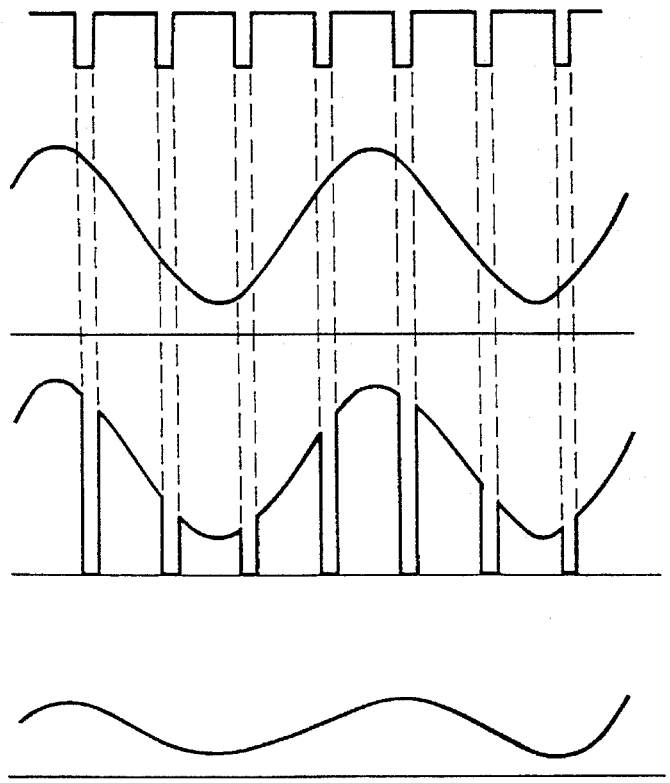
FIG. 5 is a chart for illustrating various signals associated with attenuation control in the electronic volume controller of FIG. 4.

In the electronic volume controller 502, a chopper signal S1 as shown in FIG. 5(a) is applied from the logic control circuit 509, and a receive audio signal S2 as shown in FIG. 5(b) is applied from the receive interface 501 to the transmission gate 5021.

The chopper signal S1 becomes "on" or "off" level with a predetermined duty ratio. The transmission gate 5021 outputs the receive audio signal S2 only when the chopper signal S1 is "on" level. Thus, the transmission gate 5021 outputs a signal S21 shown in FIG. 5(c). The signal S21 is then passed through the lowpass filter 5022 where the level is lowered as shown in FIG. 5(d). Thus, the electronic volume controller 502 outputs an attenuated receive audio signal S3.

Similarly, the electronic volume controller 503 attenuates a transmit audio signal S2' supplied from the amplifier 414 with the use of a chopper signal S1' supplied from the logic control circuit 509, and outputs an attenuated transmit audio signal S3'.

As described above, the attenuation factor of the electronic volume controllers 502 and 503 is determined the duty ration of the chopper signal supplied from the logic control circuit 509. Thus, the factor of attenuation to the transmit and receive audio signals can be controlled.

The logic control circuit 509 determines which one of the electronic volume controllers 502 and 503 is operated based on the output of the comparing circuit 508.

When the logic control circuit 509 judges that it is in the transmit mode based on the output "0" of the comparing circuit 508, the logic control circuit 509 controls the duty ration of the chopper signal S1 to be provided to the electronic volume controller 502 so that the receive audio signal S2 is attenuated to the signal S3.

When the logic control circuit 509 judges that it is in the receive mode based on the output "1" of the comparing circuit 508, it controls the duty ratio of the chopper signal S1' to be provided to the electronic volume controller 503 so that a transmit audio signal S2' is attenuated to a signal S3'.

When attenuating the receive audio signal or transmit audio signal by selectively controlling the attenuation factor of the electronic volume controller 502 and 503 as described above, the hands-free control circuit 415 controls the attenuation factor while considering the current setting of the volume for the speaker 492 (hereinafter refer to speaker volume value).

Referring back to FIGS. 1 and 2, the speaker volume value for the speaker 492 can be set first by selecting volume setting mode by depressing a predetermined key in a key section 430 and then entering a desired volume value through ten-keys of the key section 430. The CPU 331 outputs a volume setting value corresponding to the volume value entered through the ten-keys to the logic control circuit 509 (FIG. 6) via a digital interface 340.

The speaker volume value for the speaker 492 may be set by the operation of a volume switch. The volume switch may provide any value within a predetermined range to the logic control circuit 509.

Figure 6:
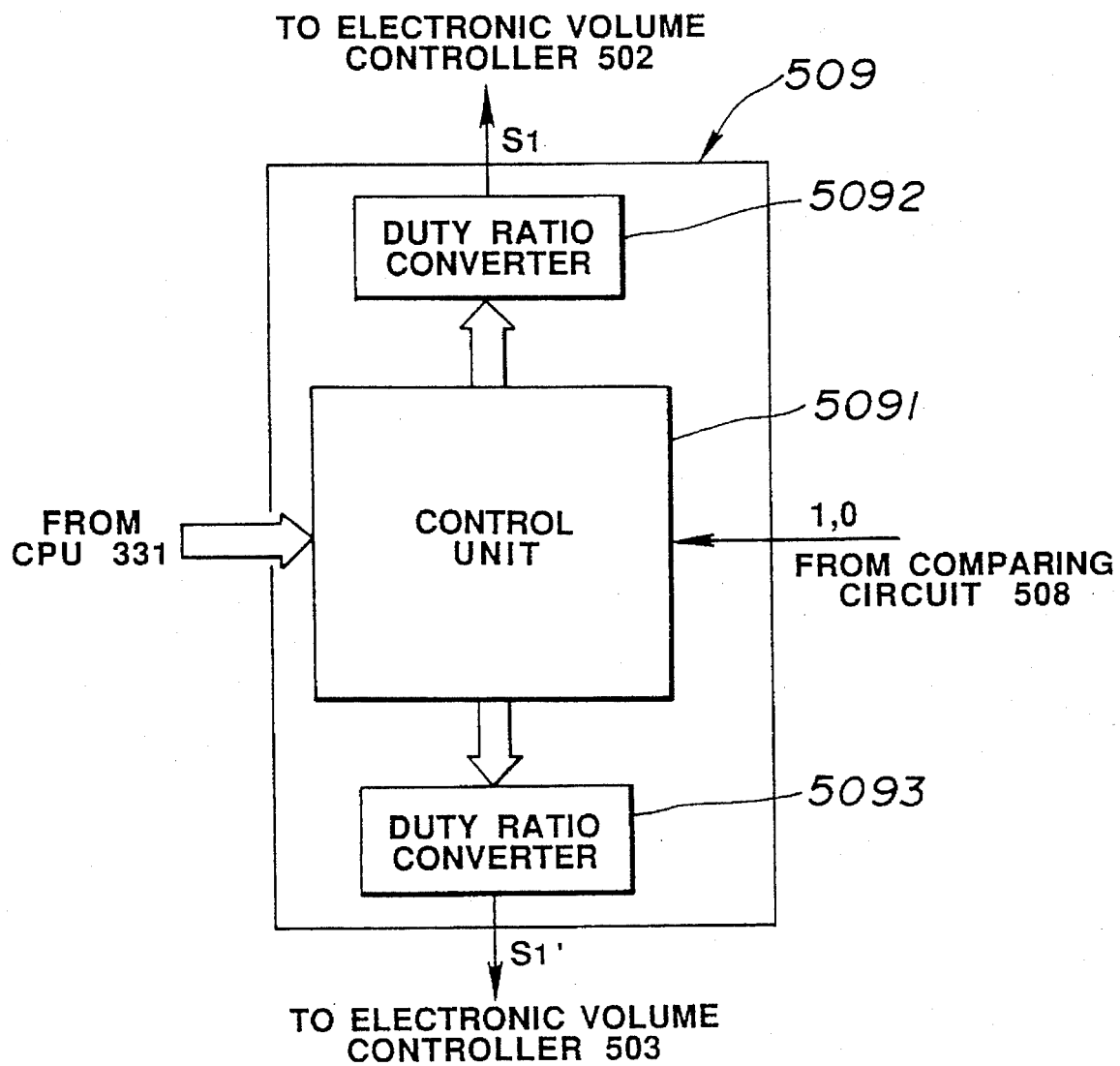
FIG. 6 is a block diagram of an logic control circuit in the hands-free control circuit of FIG. 3.

FIG. 6 shows the configuration of the logic control circuit 509 of the hands-free control circuit which comprises a control unit 5091 and duty ratio converters 5092 and 5093.

Figure 7:
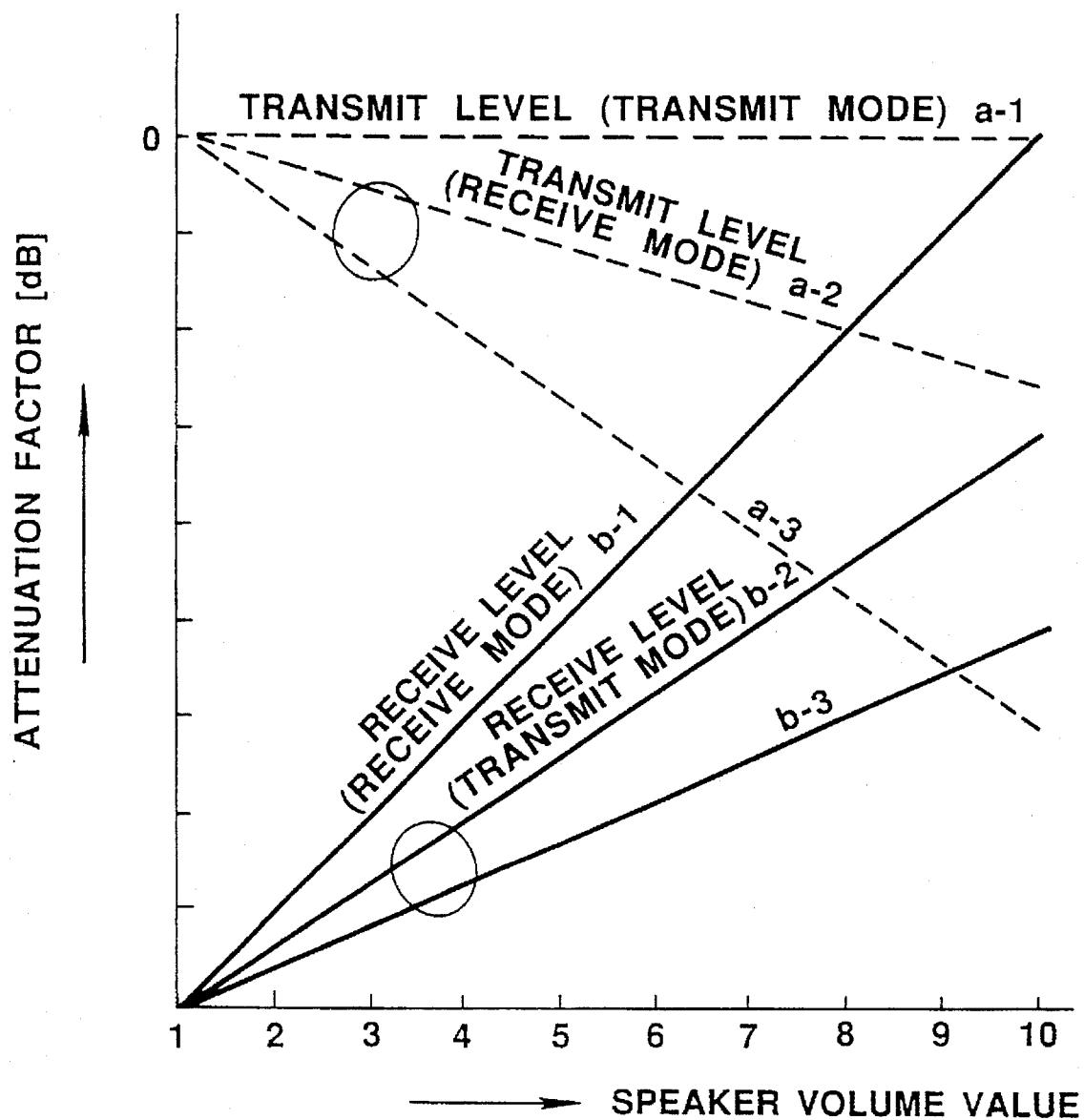
FIG. 7 is a graph showing an example of attenuation characteristics of audio signals in transmit and receive modes in the hands-free control circuit according to the present invention.

FIG. 7 is a graph showing attenuation factor of transmit and receive level with respect to the speaker volume value in which a line a-1 represents the attenuation factor of transmit level with respect to the speaker volume value in the transmit mode, lines a-2 and a-3 represent the attenuation factor of transmit level with respect to the speaker volume value in the receive mode, a line b-1 represents the attenuation factor of receive level with respect to the speaker volume value in the receive mode and lines b-2 and b-3 represent the attenuation factor of receive level with respect to the speaker volume value in the transmit mode.

In the line a-1 in which the hands-free control circuit is in the transmit mode, the transmit level is constant irrespective of the speaker volume value. When the transmit mode is switched to the receive mode, the transmit level is attenuated. According to this embodiment, it is so designed that the attenuation factor of the transmit level is decreased in a smaller speaker volume value compared with that in a larger speaker volume value as shown in the line a-2. This is in contrast to conventional hands-free control circuits in which the attenuation factor in the transmit level is constant irrespective of the speaker volume value.

For a telephone system in which its communication path has a small communication transmission loss, the attenuation factor may be controlled such that it becomes larger than that in the line a-2. This increased attenuation factor is shown in the line a-3.

In the line b-1 in which the hands-free control circuit is in the receive mode, the receive level changes in proportion to the speaker volume value. When the receive mode is switched to the transmit mode, the difference of the attenuation factor between the transmit mode and the receive mode decreases as the speaker volume value decreases.

For a telephone system in which its communication path has a small communication transmission loss, the attenuation factor may be controlled such that it becomes larger than that in the line b-2. This increased attenuation factor is shown in the line b-3.

The attenuation factors for attenuating the transmit or receive level according to the speaker volume value in such a manner as shown in FIG. 7 is set in the control unit 5091 of the logic control circuit 509 shown in FIG. 6. Based on a binary data supplied from the comparing circuit 508 and a volume setting value supplied from the CPU 331, the control unit 5091 outputs data indicative of the attenuation factor in transmit or receive level to the duty ratio converters 5092 and 5093. The duty ratio converters 5092 and 5093, in turn, supply chopper signals S1 and Si' to the electronic volume controllers 502 and 503, respectively to attenuate the transmit or receive level.

With the above-described construction of the hands-free control circuit, even when switching is carried out from the receive mode to the transmit mode under a condition that the speaker volume is lowered by the operation of the key section 430, the receive volume will not attenuated to an excessive low level, thereby to prevent the simplex communication.

In the attenuation characteristics of FIG. 7, both of the transmit and receive audio signals are attenuated according to the volume set value of the speaker 492. In the hands-free control circuit of the present invention, however, such a control method may be employed in which either one of the transmit and receive audio signals is attenuated according to the volume set value of the speaker 492.

Figure 8:
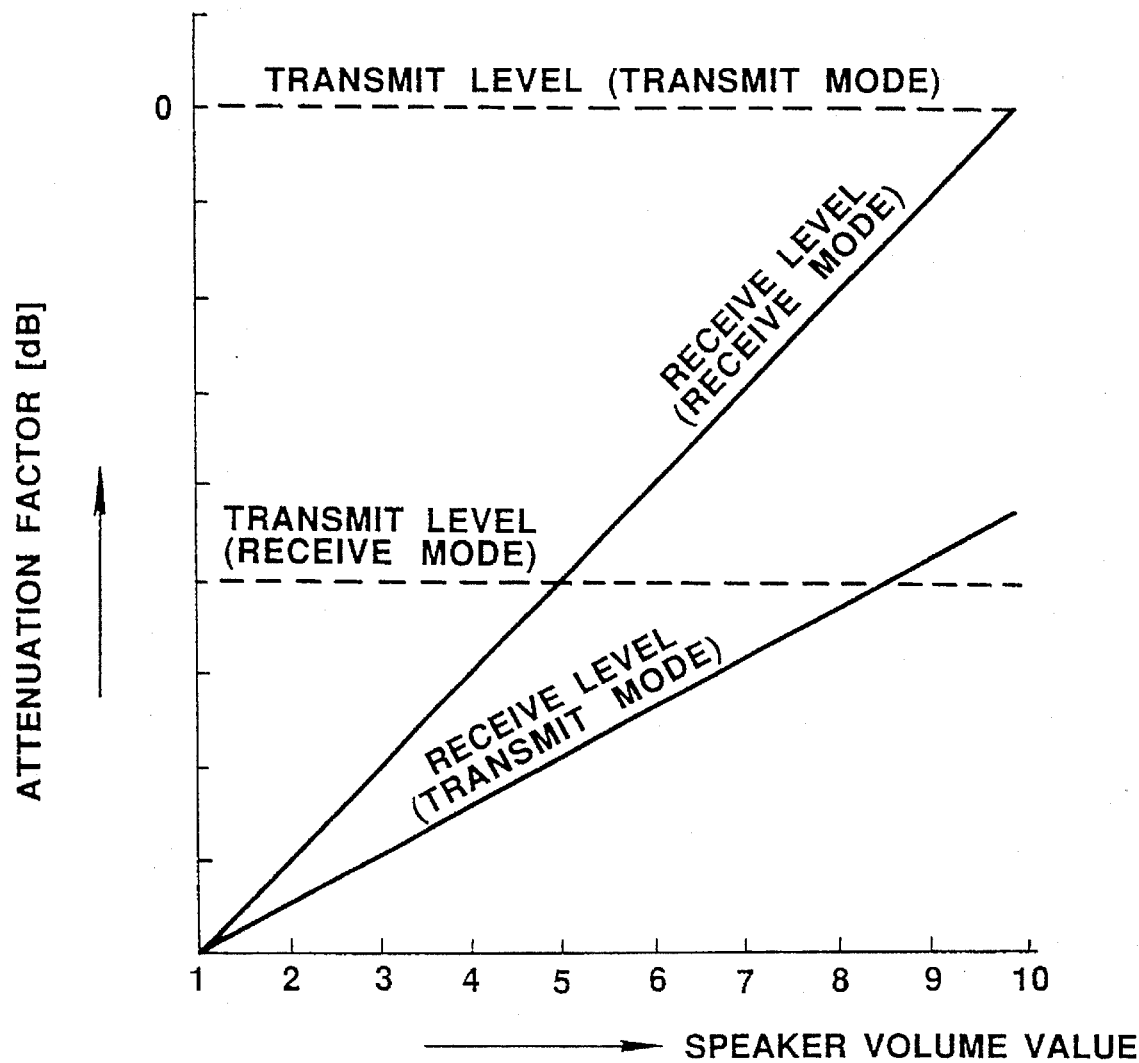
FIG. 8 is another example of the attenuation characteristics of the audio signals in the transmit and receive modes of the hands-free control circuit according to the present invention.

FIG. 8 shows an attenuation characteristics in which only the receive level is controlled in association with the volume set value of the speaker.

Figure 9:
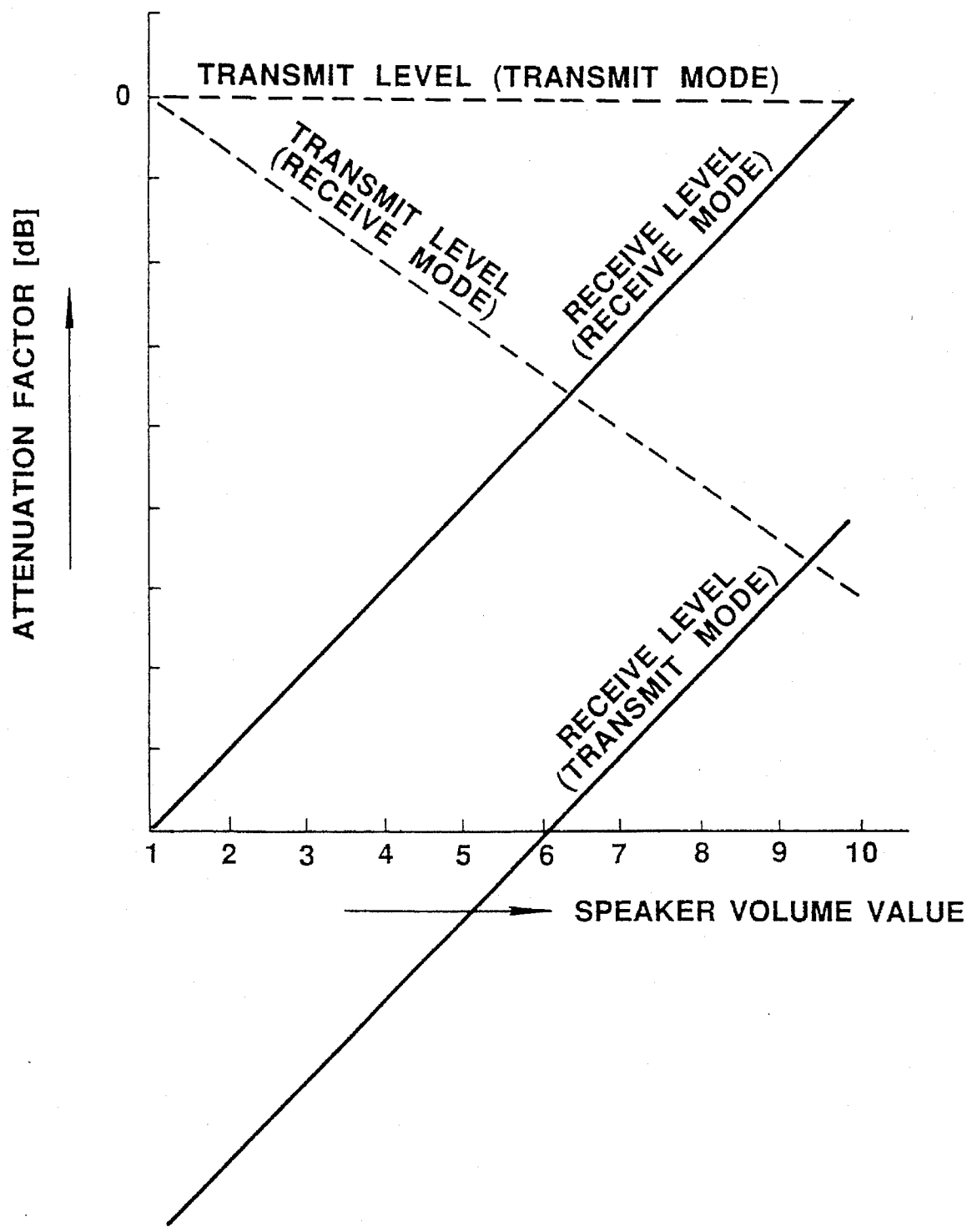
FIG. 9 is still another example of the attenuation characteristics of the audio signals in the transmit and receive modes of the hands-free control circuit according to the present invention.
Figure 10:
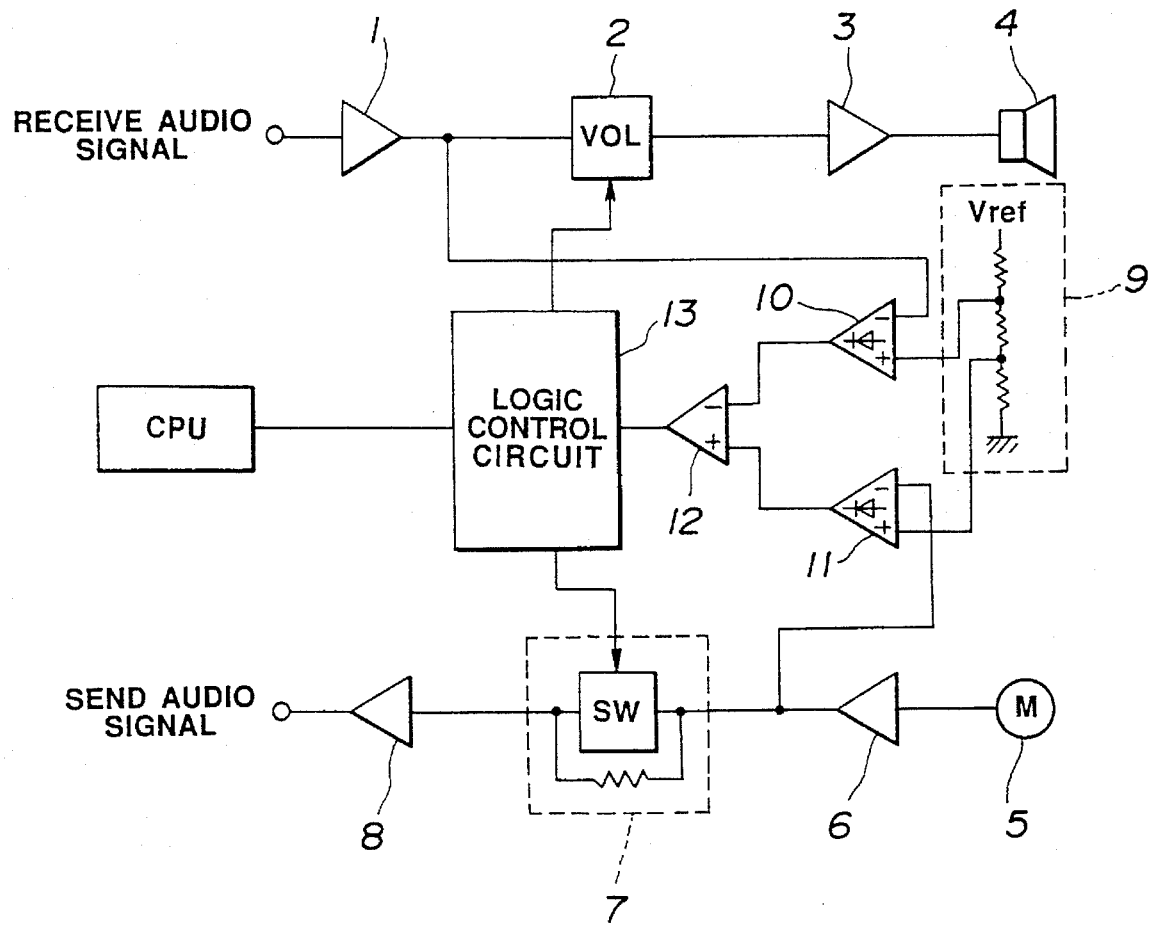
FIG. 10 is a block diagram of a conventional hands-free control circuit.
Figure 11:
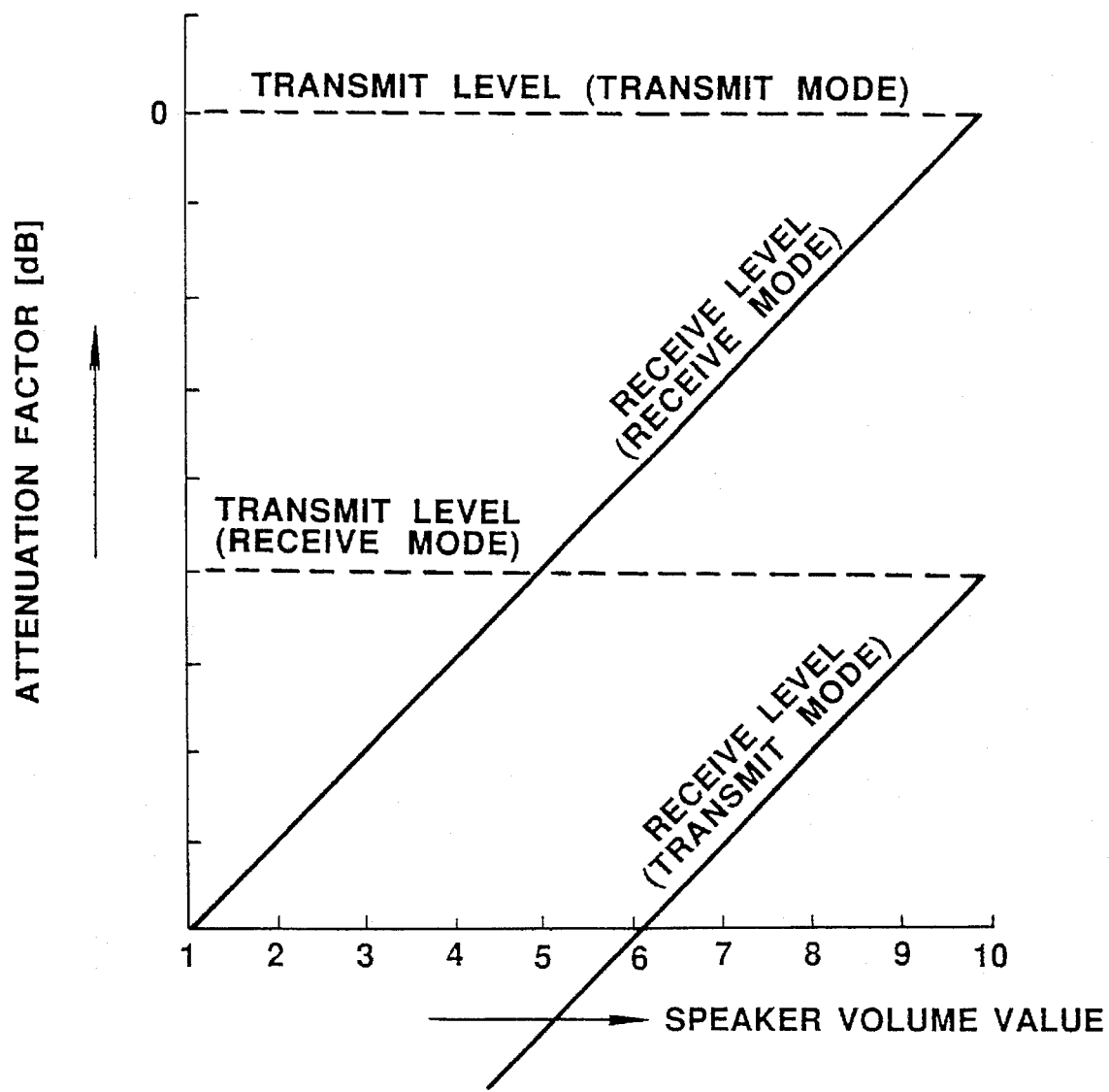
FIG. 11 is the attenuation characteristics of the audio signals in the transmit and receive modes of the conventional hands-free control circuit.

FIG. 9 shows another attenuation characteristics in which only the transmit level is controlled in association with the volume set value of the speaker.

This method for controlling one of the transmit and receive levels in association with the volume set value of the speaker can alleviate the burden of the logic control circuit 509 when compared with the method of controlling both of the transmit and receive levels.

Explanation will next be made as to the operation of the hands-free control circuit according to the present invention when no transmit audio signal is Generated and no receive audio signal is inputted (hereinafter referred to as "no transmit/receive state").

Referring to FIG. 3, the offset voltage circuit 505 supplies reference voltages to the transmit rectification circuit 507 for detecting the transmit audio signal and the receive rectification circuit 506 for detecting the receive audio signal.

The reference voltage supplied to the transmit rectification circuit 507 is higher than that of the receive rectification circuit 506. As a result, the comparing circuit 508 outputs a signal "0" indicative of the transmit mode in no transmit/receive state.

The logic control circuit 509 controls the electronic volume controller 502 based on the output "0" of the comparing circuit 508, thereby to attenuate the receive audio signal. That is, the hands-free control circuit of the present invention provides a "waiting-state transmit mode".

In the waiting-state transmit mode, the receive audio signal is attenuated and the transmit audio signal is not attenuated during the no transmit/receive state. Accordingly, ambient noises such as running car noise in the side of the mobile telephone system are sent to the other party. Thus, the present invention can prevent such a situation that, as in the waning-state receive mode, the other party is put in the silent condition and worries that the line may be disconnected.

In a conventional telephone system which is arranged to be put in the waiting-state receive mode, the ambient noise may cause unwanted switching from the receive mode to the transmit mode. Further, when the circuit is in the transmit mode, as the transmit audio signal becomes a low level in the side of the mobile telephone system, switching to the receive mode may occur. As a result, frequent switching between the transmit mode and receive mode is likely to occur. Thus, a clipping of voice frequently takes place, which results in that the speech quality is degraded to a large extent.

With this regard, according to the present invention, the transmit mode is set in the no transmit/receive state and switching from the transmit mode to the receive mode is carried out only when the receive audio signal is inputted, Thus, the frequency of unwanted switching from the transmit mode to the receive mode can be minimized and therefore a clipping of voice as mentioned above can be remarkably reduced.

In the foregoing embodiment, it is described that the hands-free control circuit is applied to a mobile telephone system. However, the hands-free control circuit according to the present invention can be applied to an ordinary telephone system and further any systems in which a duplex communication is carried out.

What is claimed is:

1. Hands-free circuitry for controlling the application of a receive audio signal from a communication path to a speaker and the application of a transmit audio signal from an audio signal source to the communication path, comprising:

first adjusting means for varying a transmit attenuation factor, thereby adjusting the transmit audio signal;

second adjusting means for varying a receive attenuation factor, thereby adjusting the receive audio signal;

comparing means for comparing a level of the transmit audio signal with a level of the receive audio signal;

input means for generating a volume value for the speaker, the volume value being used for changing the level of the receive audio signal to be applied to the speaker; and control means for activating one of the first adjusting means and the second adjusting means in response to the comparing means so as to control an adjustment of the activated one of the first adjusting means and the second adjusting means by continuously decreasing the attenuation factor of the activated adjusting means with a value of such attenuation factor before the activation of one of the first and second adjusting means being taken as a reference as the volume value of the speaker received from the input means decreases.

2. Hands-free circuitry according to claim 1, wherein the first and the second adjusting means are first and second attenuating means.

3. Hands-free circuitry according to claim 2, wherein the factor of at least either one of the first attenuating means and the second attenuating means is in proportion to the volume value of the speaker.

4. Hands-free circuitry according to claim 2, wherein the comparing means includes means for generating a level control signal in response to the volume value and the level control signal is applied to at least either one of the first attenuating means and the second attenuating means.

5. Hands-free circuitry according to claim 4, wherein the first and the second attenuating means are first and second electronic volume controllers, and the control means provides a chopper signal to at least either one of the first electronic volume controller and the second electronic volume controller, the chopper signal having a duty ratio which is determined by the mode signal and the volume value.

6. Hands-free circuitry according to claim 1, further including means for selecting one of the adjusting factors.

7. Hands-free circuitry according to claim 1, wherein the control means varies the adjusting factor of one of the first adjusting means and the second adjusting means.

8. Hands-free circuitry according to claim 1, further including first level detecting means for detecting the level of the transmit audio signal and second level detecting means for detecting the level of the receive audio signal.

9. Hands-free circuitry according to claim 8, further including bias applying means for applying a first bias to the first level detecting means and applying a second bias to the second level detecting means, the first bias being greater than the second bias.

10. Hands-free circuitry according to claim 1, wherein the input means is a key unit.

11. Hands-free circuitry according to claim 1, wherein the input means is a volume switch.

12. Hands-free circuitry according to claim 1, wherein the control means comprises:

judging means for judging whether the circuitry is in a receive mode in which attenuation of the transmit audio signal is necessary or in a transmit mode in which attenuation of the receive audio signal is necessary based on comparison by the comparing means; and another control means for controlling the second adjusting means such as to attenuating the receive audio signal at an attenuation factor of the speaker volume value when the circuitry is in the receive mode, and when the circuitry is in the transmit mode, the attenuation factor of the receive audio signal is increased compared with an occasion when the circuitry is in the receive mode and difference between the attenuation factors of the receive audio signal in the transmit mode and in the receive mode is continuously decreased as the speaker volume value increases, and for controlling the first adjusting means such as to increasing the attenuation factor of the transmit audio signal as the speaker volume value increases only when the circuitry is in the receive mode.

* * * * *